United States Patent Office 3,148,188
Patented Sept. 8, 1964

3,148,188
BENZOTHIAZINE DERIVATIVES
Wallace K. Hoya, Milwaukee, Wis., assignor to Colgate-Palmolive Company, a corporation of Delaware
No Drawing. Filed Dec. 20, 1961, Ser. No. 160,925
5 Claims. (Cl. 260—243)

This invention relates to benzothiazine. More particularly, this invention is concerned with novel derivatives of benzothiazine, as well as intermediates and processes useful for producing such compounds and pharmacological uses for the benzothiazine derivatives.

According to one aspect of this invention there are provided novel benzothiazine derivatives of the formula

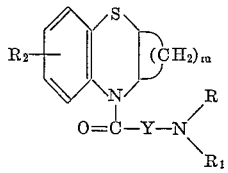

and acid addition salts thereof, wherein Y is a lower alkylene that is straight or branched such as methylene, ethylene, propylene, isopropylene and 2,3-butylene, R and $R_1$ are the same or different members of the group consisting of hydrogen, lower alkyls such as methyl, ethyl and propyl, aryl groups such as phenyl and naphthyl, phenyl-lower alkyl groups such as benzyl, phenethyl, phenylisopropyl, phenylpropyl and 2-phenyl-3-butylene and the group

represents heterocyclicamino groups such as piperidino, pyrrolidino, piperazino, 4-lower alkyl piperazino, 4-(phenyl-lower alkyl)-piperazino, morpholino, indolino, isoindolino, 1,2,3,4-tetrahydroisoquinolino and 1,2,3,4-tetrahydroquinolino, $R_2$ is hydrogen, a halogen such as chlorine and bromine, a lower alkoxy such as methoxy, ethoxy and propoxy, a lower thioalkoxy such as thiomethoxy and thioethoxy and halo-lower alkyl groups such as 2-chloroethyl and trifluoromethyl, and $m$ is an integer from 3 to 6.

The N-(aminoalkanoyl)-polyhydrocycloalka [b] 1,4-benzothiazines can be produced by reacting an appropriate polyhydrocycloalka [b] 1,4-benzothiazine with a haloalkanoyl halide to produce an N-(haloalkanoyl)-polyhydrocycloalka [b] 1,4-benzothiazine which is then reacted with an amine to form the N-(aminoalkanoyl)-polyhydrocycloalka [b] 1,4-benzothiazine. This process can be represented as follows:

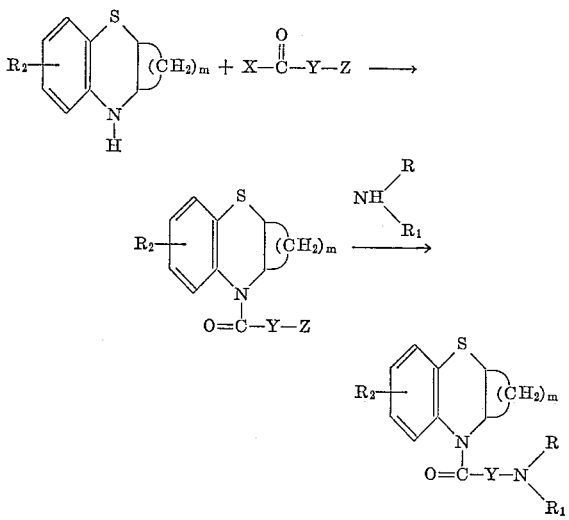

wherein $m$, R, $R_1$, $R_2$ and Y have the significance previously assigned, and X and Z are the same or different reactive halogen such as chlorine and bromine.

Some of the polyhydrocycloalka [b] 1,4-benzothiazines are 1,2,3,3a,9,9a-hexahydrocyclopenta [b] 1,4-benzothiazine,
1 H 2,3,4,4a,10,10a-hexahydrocyclohexa [b] 1,4-benzothiazine,
1,2,3,4,5,5a,11,11a-octahydrocyclohepta [b] 1,4-benzothiazine,
1 H 2,3,4,5,6,6a,-12,12-octahydrocycloocta [b] 1,4-benzothiazine,
6 - methoxy - 1,2,3,3a,9,9a - hexahydrocyclopenta [b] 1,4-benzothiazine,
1 H 8-trifluoromethyl-2,3,4,4a,10,10a-hexahydrocyclohexa [b] 1,4-benzothiazine,
8-chloro-1,2,3,4,5,5a,11,11a-octahydrocyclohepta [b] 1,4-benzothiazine and
1 H 10-thiomethoxy-2,3,4,5,6,6a,12,12a-octahydrocycloocta [b] 1,4-benzothiazine.

Of the polyhydrocycloalka [b] 1,4-benzothiazines used as reactants in this process, there is shown in Chemical Abstracts 51, 12101b (1957) and 53, 11386 and 17155 (1959) the preparation of 1 H 2,3,4,4a,10,10a-hexahydrocyclohexa [b] 1,4-benzothiazine. The reactants having fully saturated cyclopenta, cyclohepta and cycloocta structures for the third ring are considered novel compounds, the production of all of which will be described hereinafter as well as of the cyclohexa compound.

Representative of the haloalkanoyl halides which can be used in the process are chloroacetyl chloride, beta-bromo-propionyl chloride, beta-chlorobutyryl chloride and alpha-methyl-gamma-bromobutyryl bromide.

The reaction can be readily effected by bringing the benzothiazine and haloalkanoyl halide together in the presence of an inert dry organic liquid reaction medium such as benzene, hexane, toluene, xylene and dioxane. The reaction can be promoted by heating the reaction mixture, such as at the reflux temperature, for a few hours. After the reaction has gone to substantial completion the reaction mixture can be cooled, washed with an aqueous inorganic base, dried and isolated by evaporation to dryness.

Some of the N-(haloalkanoyl)-polyhydrocycloalka [b] 1,4-benzothiazines that can be produced as described are 9-(alpha-bromoacetyl)-1,2,3,3a,9,9a-hexahydrocyclopenta [b] 1,4-benzothiazine,
N-(beta-bromopropionyl)-1,2,3,3a,9,9a-hexahydrocyclopenta [b] 1,4-benzothiazine,
1 H 10-(alpha-chloroacetyl)-2,3,4,4a,10,10a-hexahydrocyclohexa [b] 1,4-benzothiazine,
11-(gamma-bromobutyryl)-1,2,3,4,5,5a,11,11a-octahydrocyclohepta [b] 1,4-benzothiazine,
1 H 12-(alpha-methyl-beta-bromopropionyl)-2,3,4,5,6,6a,12,12a-octahydrocycloocta [b] 1,4-benzothiazine,
9-(gamma-bromobutyryl)-6-methoxy-1,2,3,3a,9,9a-hexahydrocyclopenta [b] 1,4-benzothiazine and
1 H 10-(beta-chloropropionyl)-8-chloro-2,3,4,4a,10,10a-hexahydrocyclohexa [b] 1,4-benzothiazine.

Formation of the N-(aminoalkanoyl)-polyhydrocycloalka [b] 1,4-benzothiazines is effected by the reaction of ammonia or a primary or secondary amine with an N-(haloalkanoyl) - polyhydrocycloalka [b] 1,4 - benzothiazine. The reaction is readily effected by bringing the reactants together in the presence of a liquid reaction medium which can be an excess of the aminating reactant and/or an inert organic solvent such as toluene, xylene or benzene. Moderately elevated temperatures, such as up to the reflux temperature, promote the reaction. A two to ten fold excess of aminating agent is advisably used. After the reaction is terminated the desired product can be recovered from the reaction mixture by conventional manipulative procedures.

Besides ammonia, amines such as methylamine, ethylamine, propylamine, dimethylamine, diethylamine, methyl ethyl amine, methyl benzyl amine, benzylamine, phenethylamine, phenylamine, dibenzylamine, morpholine, pyrrolidine, piperidine, isoindoline, indoline, 1,2,3,4-tetrahydroisoquinoline, 1,2,3,4-tetrahydroquinoline, 4-methylpiperazino, 4-benzylpiperazino and 4-phenylisopropylpiperazino can be used.

Some of the N-(aminoalkanoyl)-polyhydrocycloalka [b] 1,4-benzothiazines which can be produced as described are 9-(alpha-aminoacetyl)-1,2,3,3a,9,9a-hexahydrocyclopenta [b] 1,4-benzothiazine, 9-(beta-N-methylaminopropionyl)-1,2,3,3a,9,9a-hexahydrocyclopenta [b] 1,4-benzothiazine, 1 H 10-(alpha-N-benzylaminoacetyl)-2,3,4,4a,10,10a-hexahydrocyclohexa [b] 1,4-benzothiazine, 11-(gamma-N,N-dimethylaminobutyryl)-1,2,3,4,5,5a,11,11a-octahydrocyclohepta [b] 1,4-benzothiazine, 1 H 12-(alpha-methyl-beta-N,N-dibenzylaminopropionyl)-2,3,4,5,6,6a,12,12a-octahydrocycloocta [b] 1,4-benzothiazine, 9-(gamma-piperidinobutyryl)-6-methoxy-1,2,3,3a,9,9a-hexahydrocyclopenta [b] 1,4-benzothiazine, 1 H 10-(beta-pyrrolidinopropionyl)-8-chloro-2,3,4,4a,10,10a-hexahydrocyclohexa [b] 1,4-benzothiazine and 9-(beta-4-methylpiperazinopropionyl)-1,2,3,3a,9,9a-hexahydrocyclopenta [b] 1,4-benzothiazine.

The bases of this invention are usually viscous oils. They form acid addition salts, however, which are crystalline.

Acid addition salts of the bases of this invention are produced by contacting the compounds with an organic or inorganic acid such as hydrochloric, sulphuric, formic, citric, maleic, succinic, tartaric, benzoic, fumaric, salicylic and acetylsalicylic.

The compounds of this invention are skeletal muscle relaxants and tranquilizers. 9-(beta-N-methylaminopropionyl) - 1,2,3,3a,9,9a - hexahydrocyclopenta [b] 1,4-benzothiazine hydrochloride is an especially potent skeletal muscle relaxant. The muscle relaxation activity of this compound was evaluated in the mouse by the prehensile reflex test and the inclined screen technique.

In the inclined screen procedure, two groups of ten male mice (20–30 g.) were injected subcutaneously with the compound in a volume of 0.01 ml./gm. at concentrations of 0.5% and 1.0%. Immediately thereafter, the mice from each dosage group were placed upon 16 inch by 35 inch stalls of 16 mesh nylon screen inclined at 60°. Animals displaying skeletal muscle paralysis or weakness and abruptly sliding to the bottom of the screen within one-half hour were considered positive reactors. The $ED_{50}$ was estimated by the method of Miller and Tainter, Proc. Soc. Exper. Biol. and Med., 57, 261 (1944).

In the prehensile reflex test, untreated male mice (25–32 g.) having demonstrated their ability to cling to a taut string until a sixty second cut-off, were given the compound as a 2.0% aqueous solution by stomach tube. Their clinging ability was retested at five various times thereafter, and the group mean hanging time calculated. Muscle weakness reduced the group mean hanging time as a function of the compound dosage. The end point was obtained by plotting the log dose vs. maximum percent inhibition of control mean hanging time. The following results were obtained:

| Prehensile Reflex $PD_{50}$ | Inclined Screen $ED_{50}$ |
|---|---|
| 111 mg./kg. | 50 mg./kg.±7 |

The active agents of this invention may be administered to animals and humans as pure compounds, usually as a nontoxic acid addition salt. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administration to a patient or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active agents as a nontoxic acid addition salt and may be administered one or more at a time at regular intervals. Such unit dosage forms, however, should generally contain a concentration of 0.1% to 10% by weight of one or more of the active benzothiazines.

A typical tablet may have the composition:

| | Mg. |
|---|---|
| 1. 9 - (beta - N-methylaminopropionyl)-1,2,3,3a,9,9a-hexahydrocyclopenta [b] 1,4-benzothiazine HCl | 25 |
| 2. Starch U.S.P. | 57 |
| 3. Lactose U.S.P. | 73 |
| 4. Talc U.S.P. | 9 |
| 5. Stearic acid | 6 |

Powders 1, 2 and 3 are slugged, then granulated, mixed with 4 and 5, and tableted.

Capsules may be prepared by fillnig No. 3 hard gelatin capsules with the following ingredients, thoroughly mixed:

| | Mg. |
|---|---|
| 1. 9 - (beta - N - methylaminopropionyl)-1,2,3,3a,9,9a - hexahydrocyclopenta [b] 1,4 - benzothiazine HCl | 10 |
| 2. Lactose U.S.P. | 200 |
| 3. Starch U.S.P. | 16 |
| 4. Talc U.S.P. | 8 |

Unit dosages can contain about 10 to 100 mgm. of one or more of the novel compounds of this invention and can be administered daily as warranted.

The polyhydrocycloalka [b] 1,4-benzothiazines used in the process described hereinabove can be produced by reacting an o-aminobenzenethiol with an o-halocycloalkanone to produce a polyhydrocycloalka [b] 1,4-benzothiazine having an unsaturated nitrogen which is then reduced. This process can be represented as follows:

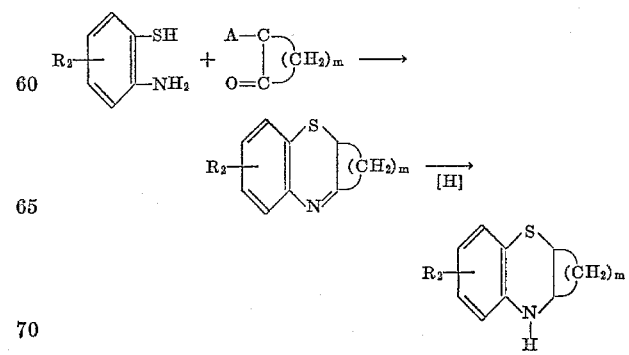

wherein $m$ and $R_2$ have the significance previously assigned and A is a reactive halogen such as chlorine and bromine.

In addition to o-aminobenzene thiol, similar compounds having nuclear substituents for $R_2$ can be used, including those in which the substituent is in the ortho, meta and para positions in either direction from the thiol group such as meta-methyl, para-methoxy, para-chloro, p-trifluoromethyl and meta-thioethoxy.

Reaction between the o-aminobenzene thiol and o-halocycloalkanone is effected by combining the reactants in a suitable liquid reaction medium such as alcohol, benzene, toluene and xylene. An alkali metal alkoxide is added to combine with the hydrohalide formed in the reaction. Moderately elevated temperatures such as up to the reflux temperature are generally employed to promote the reaction. The reaction is usually substantially completed in 1 to 3 hours. Following termination of the reaction the reaction mixture can be filtered and the product isolated by evaporation to dryness. It can be purified by distillation under reduced pressure.

By selecting the proper reactants there are produced in this way compounds such as:

1,2,3,3a-tetrahydrocyclopenta [b] 1,4-benzothiazine,
1 H 2,3,4,4a-tetrahydrocyclohexa [b] 1,4-benzothiazine,
1,2,3,4,5,5a-hexahydrocyclohepta [b] 1,4-benbothiazine,
1 H 2,3,4,5,6,6a-hexahydrocycloocta [b] 1,4-benzothiazine,
6-methyl-1,2,3,3a-tetrahydrocyclopenta [b] 1,4-benzothiazine,
1 H 8-chloro-2,3,4,4a-tetrahydrocyclohexa [b] 1,4-benzothiazine,
9-ethoxy-1,2,3,4,5,5a-hexahydrocyclohepta[b] 1,4-benzothiazine
and 1 H 9-thiomethoxy-2,3,4,5,6,6a-hexahydrocycloocta [b] 1,4-benzothiazine.

Reduction of the double bond or unsaturated linkage at the nitrogen can be effected catalytically or chemically. Reduction with lithium aluminum hydride is the preferred method using a dry liquid reaction medium such as ether, dioxane and tetrahydrofuran. Elevated temperatures such as the reflux temperature enhance the reaction. At reflux temperatures from 1 to 8 hours is usually sufficient to substantially complete the reaction. After the reaction is terminated, water can be added to the mixture to decompose excess lithium aluminum hydride. To recover the product the mixture is filtered, the organic phase is separated and the aqueous residue extracted, preferably with the same solvent. The organic phase and extracts then can be combined, dried and the product distilled.

Products which are representative of those which can be produced as described are those named hereinabove as representative reactants with the haloalkanoyl halides.

The following examples are presented to illustrate the invention.

EXAMPLE 1

*1,2,3,3a-Tetrahydrocyclopenta [b] 1,4-Benzothiazine*

5.8 g. (0.25 mole) of sodium was reacted with 250 cc. of ethanol, after which 31.3 g. (0.25 mole) of o-aminobenzenethiol was added and the solution was heated to reflux. To the above solution was added 29.6 g. (0.25 mole) of 2-chlorocyclopentanone (freshly distilled) and the mixture was refluxed for five hours. The sodium chloride was filtered off, and the filtrate was concentrated to dryness under vacuum. The product was vacuum distilled, B.P. 123–125° C. (0.02 mm.); yield 31.3 g. (66.2%), $N_D^{25}$ 1.6545.

*Analysis.*—Calcd. for $C_{11}H_{11}NS$: N, 7.40. Found: N, 7.31.

EXAMPLE 2

*1,2,3,3a,9,9a-Hexahydrocyclopenta [b] 1,4-Benzothiazine*

To 14 g. (0.37 mole) of lithium aluminum hydride in 250 cc. of tetrahydrofuran was added a solution consisting of 69.5 g. (0.37 mole) of 1,2,3,3a-tetrahydrocyclopenta [b] 1,4-benzothiazine and 200 cc. of tetrahydrofuran. The mixture was refluxed for three hours. The excess lithium aluminum hydride was destroyed with 15 cc. of water, and the complex was decomposed with 25 cc. of 40% potassium hydroxide solution. The inorganic salts were filtered off, the filtrate dried over potassium carbonate, and the product was collected by distillation, B.P. 121–124° C. (0.03 mm.); yield 58 g. (82%).

*Analysis.*—Calcd. for $C_{11}H_{13}NS$: N, 7.33. Found: N, 7.28.

EXAMPLE 3

*9-(Beta-Bromopropionyl)-1,2,3,3a,9,9a-Hexahydrocyclopenta [b] 1,4-Benzothiazine*

A mixture consisting of 17.1 g. (0.1 mole) of beta-bromopropionyl chloride, 19.1 g. (0.1 mole) of 1,2,3,3a, 9,9a-Hexahydrocyclopenta [b] 1,4-benzothiane and 150 cc. of dry benzene was refluxed for five hours. The solution was washed with saturated sodium bicarbonate, water, and dried over sodium sulfate. The solution was concentrated to dryness in vacuo, the residue was extracted twice with 200 cc. of boiling n-hexane, filtered, and the solvent was distilled off; yield 26 g. (80%) of amber oil.

EXAMPLE 4

*9-(Beta-N-Methylaminopropionyl)-1,2,3,3a,9,9a-Hexahydrocyclopenta [b] 1,4-Benzothiazine*

To a solution of 50 cc. of liquid methylamine and 75 cc. of dry toluene was added 26 g. (0.08 mole) of 9-(beta-bromopropionyl) - 1,2,3,3a,9,9a-hexahydrocyclopenta [b] 1,4-benzothiazine and 75 cc. of dry toluene. The mixture was refluxed for two hours, the salt filtered off and the filtrate concentrated to dryness; residue 21.3 g. (96.5%).

Hydrochloride Salt

The base dissolved in 150 cc. of ether was acidified to pH-3 with ethereal hydrochloric acid. The solid was filtered off, suspended in 200 cc. of boiling acetonitrile, and dried at 90° C.; yield 14.55 g. (58%), M.P. 184–185° C.

*Analysis.*—Calcd. for $C_{15}H_{21}ClN_2OS$: N, 4.48; Cl, 11.33. Found: N, 4.44; Cl, 11.20.

Various changes and modifications of the invention can be made and, to the extent that such variations incorporate the spirit of this invention, they are intended to be included within the scope of the appended claims.

What is claimed is:

1. A member of the group consisting of compounds of the formulas

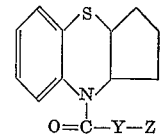

and

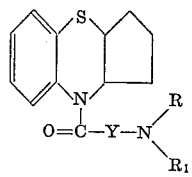

and nontoxic pharmaceutically acceptable acid addition salts thereof, wherein Y is lower alkylene, Z is a member of the group consisting of bromine and chlorine, and R and $R_1$ are members of the group consisting of hydrogen and lower alkyl.

2. A compound of the formula

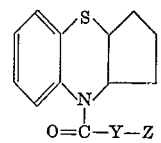

wherein Y is lower alkylene and Z is a member of the group consisting of bromine and chlorine.

3. A compound of the formula

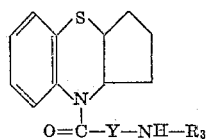

wherein Y is lower alkylene and $R_3$ is lower alkyl.

4. 9 - (beta-bromopropionyl)-1,2,3,3a,9,9a-hexahydrocyclopenta [b] 1,4-benzothiazine.

5. 9 - (beta - N - methylaminopropionyl)-1,2,3,3a,9,9a-hexahydrocyclopenta [b] 1,4-benzothiazine.

References Cited in the file of this patent
UNITED STATES PATENTS
1,867,863    Muth _____ July 19, 1932

OTHER REFERENCES

Hromatka et al.: Monatsh. Chem., vol. 88, pp. 234–49 (1957).

Fujii: Jour. Pharm. So. Japan, vol. 77, pp. 352–55 and 362–66 (1957), RS 1–P45.